March 26, 1963     T. H. LEITER     3,082,641

THROTTLE PEDAL DEPRESSOR

Filed Feb. 23, 1962

INVENTOR.
Thane H. Leiter
BY Learman, Learman & McCulloch

ATTORNEYS

United States Patent Office 3,082,641
Patented Mar. 26, 1963

3,082,641
THROTTLE PEDAL DEPRESSSOR
Thane H. Leiter, 401 Court St., Saginaw, Mich.
Filed Feb. 23, 1962, Ser. No. 175,036
3 Claims. (Cl. 74—532)

This invention relates to apparatus for depressing the throttle pedal of a vehicle and more particularly to apparatus that is adapted to be applied to the throttle pedal of any vehicle and depress the latter to any desired extent so as to permit the engine of such vehicle to be run at a selected speed.

There are many instances when the engine of an automobile must be run at a speed greater than idling speed even though the vehicle is not being driven. For example, used car sellers normally arrange their cars on a lot for display, and each car must be able to be started and driven in the event a prospective customer displays interest in it. It is well known that long periods of inactivity will cause the battery of a vehicle to lose its charge and, in addition, prolonged idleness of a vehicle engine may cause critical parts thereof to become adversely affected by rust and the like. Accordingly, it is the practice of most operators of used car lots to start and run the engine of each vehicle periodically so as to maintain its battery charged and to prevent deterioration of the engine parts. In order to charge the battery of a vehicle, the engine must be run at a speed that is greater than the engine idling speed.

Another instance where throttle pedal depressors of the kind with which the invention is concerned find use is in repair garages where it sometimes is desirable for the engine of an automobile under repair to be run at a speed somewhat greater than idling. In addition, many car owners, particularly in cold weather, make a practice of starting their car engines well in advance of driving their cars so as to enable the engines and the heating apparatus to warm up before actually using the vehicles.

An object of this invention is to provide throttle depressing apparatus which is capable of use with any vehicle, thereby permitting the depressor to be made in but one size only and still be universally adaptable.

Another object of the invention is to provide throttle depressor apparatus that is capable of depressing a vehicle throttle pedal to any desired extent so as to permit the engine of the vehicle to be run at any one of a large number of different speeds.

A further object of the invention is to provide throttle depressing apparatus which is light weight and compact in size so as to require little space for storage.

Another object of the invention is to provide throttle depressing apparatus of the kind indicated which is simple in construction and operation, inexpensive to manufacture, and rugged and durable in use.

Other objects and advantages of the invention will be pointed out specifically or will become apparent from the following description when it is considered in conjunction with the appended claims and the accompanying drawing, in which:

Figure 1:
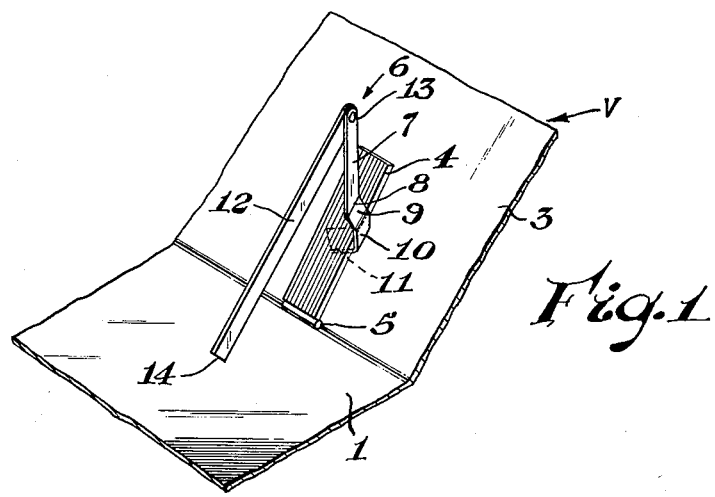
FIGURE 1 is a fragmentary, perspective view illustrating a throttle depressor constructed in accordance with the invention and applied to the throttle pedal of a conventional vehicle.
Figure 2:
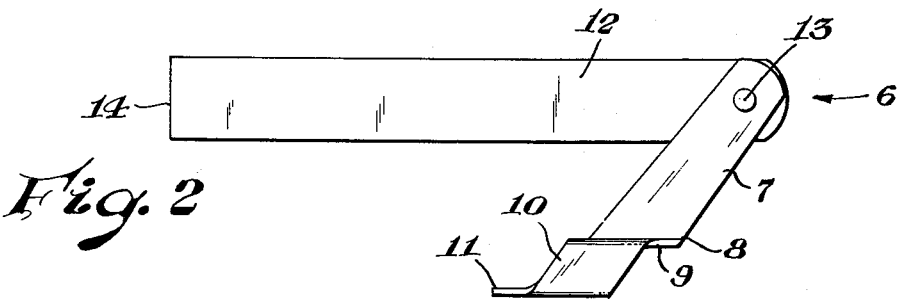
FIGURE 2 is an elevational view of one side of the depressor.
Figure 3:
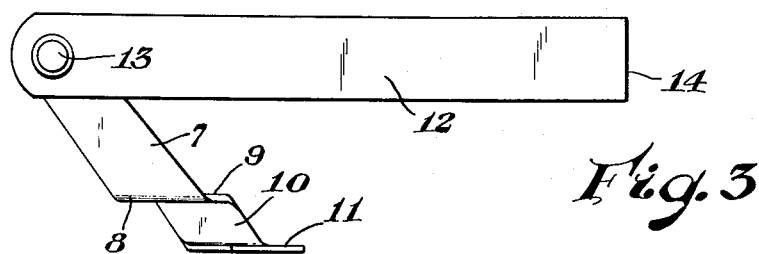
FIGURE 3 is an elevational view of the opposite side of the depressor.
Figure 4:
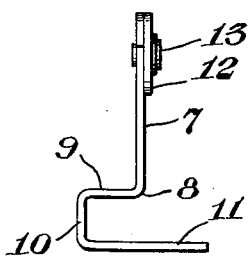
FIGURE 4 is a front elevational view of the depressor.

Apparatus constructed in accordance with the invention is adapted for use on a conventional vehicle V having a substantially horizontal floor board 1 and an upwardly and forwardly inclined foot board 3, a throttle pedal 4 being pivoted as at 5 at the juncture of the floor board and foot board so as to be capable of being depressed toward the foot board 3. Suitable spring means (not shown) customarily are interposed between the foot board and the pedal 4 so as to bias the latter toward its normal position.

A depressor formed according to the invention is indicated by the reference character 6 and comprises a generally linear pedal engaging link 7 that is bent intermediate its ends as at 8 to form a laterally extending section 9 that terminates in a reversely bent loop portion 10. A terminal end section 11 extends from the loop 10 in a plane substantially parallel to the plane of the offset section 9, but the sections 9 and 11 preferably diverge in a direction away from the loop 10. The sections 9 and 11 are spaced from one another a distance at least as great as the thickness of the throttle pedal 4, and preferably somewhat greater, so as to enable the sections 9 and 11 to straddle the pedal with the section 9 bearing against the upper surface of the pedal and the section 11 lying adjacent the lower surface of the pedal.

Forming part of the depressor construction is a stabilizing or force transmitting link 12, one end of which is pivotally connected to the link 7 by means of a pivot pin or rivet 13. The link 12 preferably is longer than the link 7 and is of such length that, when the link 7 is applied to the pedal 4, the free end 14 of the link 12 may bear against the floor board 2 rearwardly of the throttle pedal. The end 14 of the link 12 may be squared, as shown, pointed, or otherwise shaped so as to prevent slipping of the link relatively to the floor board.

In use, the link 7 is applied to the throttle pedal 4 at a selected point between the ends of the latter so that a portion of the pedal is received between the sections 9 and 11. Preferably, the apparatus is applied to the pedal at a position nearer the free end of the latter than to the pivoted end, so as to require less force to depress the pedal. When the pedal is received between the sections 9 and 11, the free end 14 of the link 12 may be placed in engagement with the floor board 1 of the vehicle. In these positions of the parts the links 7 and 12 define an acute angle. Thereafter, the link 7 may be rocked about the pivot 13 toward the link 12, while the link 12 simultaneously is rocked about its free end 14 toward the foot board 3. As a result of these movements, the link 7 will be rocked relatively to the pedal 4 so as to cause the latter to be clamped tightly between the sections 9 and 11. Clamping of the pedal between these sections stabilizes the link 7 on the pedal, and such action is enhanced by the divergence of the sections 9 and 11.

After the link 7 has been rocked a distance sufficient to effect clamping of the pedal between the sections 9 and 11, further rocking of the links 7 and 12 in the directions previously referred to will cause the throttle pedal to be depressed. The return spring associated with the pedal 4 will bias the latter to its return position, and the force of the spring will urge the pedal into even tighter clamping engagement between the sections 9 and 11, thereby tending to rock the link in a direction away from the foot board 3 and about an axis or a fulcrum that is adjacent the pedal 4. The non-skid engagement between the end 14 of the link 12 and the floorboard 2, however, prevents such rocking of the link 7 and maintains the throttle pedal in its depressed condition. The extent to which the pedal is depressed may vary within wide limits.

To remove the apparatus from the throttle pedal, the link 12 may be pushed forwardly or toward the foot board 3 so as to enable its free end to be lifted off the floor board 3, whereupon the link 7 may be disconnected from the pedal 4.

The disclosed embodiment is representative of a presently preferred form of the invention but is intended to be illustrative rather than definitive thereof. The invention is defined in the claims.

I claim:

1. Apparatus for depressing a depressable throttle pedal of a vehicle having a floor board rearwardly of said pedal, said apparatus comprising a first rigid link having a substantially planar portion terminating at one end in a laterally offset, substantially planar first section lying in a plane substantially normal to the plane of said first portion, said first section terminating in a reversely turned loop to form a second substantially planar section lying in a plane that is substantially parallel to but spaced from the plane of said first section a distance at least as great as the thickness of said pedal so as to enable said sections to straddle said pedal, said first and second sections diverging in a direction away from said loop; and a second rigid link connected at one of its ends to the other end of said first link and extending downwardly and rearwardly from said other end of said first link at an acute angle thereto so that its other end may bear upon said floor board rearwardly of said pedal.

2. The apparatus set forth in claim 1 including pivotal means connecting said one end of said second link to said other end of said first link.

3. The apparatus set forth in claim 1 wherein said other end of said second link is provided with a pointed surface to provide nonslip engagement with said floor board.

References Cited in the file of this patent

UNITED STATES PATENTS

| | | |
|---|---|---|
| 1,434,760 | Wunder | Nov. 7, 1922 |
| 1,487,385 | Hoy | Mar. 18, 1924 |
| 1,783,902 | Brost | Dec. 2, 1930 |
| 2,729,115 | Reynolds et al. | Jan. 3, 1956 |
| 2,955,485 | Powers | Oct. 11, 1960 |